(12) United States Patent
Ishii

(10) Patent No.: US 7,642,723 B2
(45) Date of Patent: Jan. 5, 2010

(54) VEHICULAR LAMP LIGHTING CIRCUIT

(75) Inventor: Satoru Ishii, Isehara (JP)

(73) Assignee: Ichikoh Industries, Inc., Tokyo (JP)

( * ) Notice: Subject to any disclaimer, the term of this patent is extended or adjusted under 35 U.S.C. 154(b) by 0 days.

(21) Appl. No.: 12/058,015

(22) Filed: Mar. 28, 2008

(65) Prior Publication Data

US 2008/0238324 A1    Oct. 2, 2008

(30) Foreign Application Priority Data

Mar. 30, 2007    (JP)    ............................. 2007-090528

(51) Int. Cl.
*B60Q 1/14*    (2006.01)
(52) U.S. Cl. ........................... 315/77; 315/82; 315/294; 315/307; 307/10.1
(58) Field of Classification Search .................. 315/77, 315/82, 224, 291, 294, 299, 307, 308, 312, 315/320, 324; 307/10.1, 10.8
See application file for complete search history.

(56) References Cited

U.S. PATENT DOCUMENTS

| | | | |
|---|---|---|---|
| 7,274,150 B2 * | 9/2007 | Takeda et al. ................. 315/77 |
| 7,327,051 B2 * | 2/2008 | Ito et al. ..................... 307/10.8 |
| 7,482,765 B2 * | 1/2009 | Ito et al. ...................... 315/312 |
| 2005/0179393 A1 * | 8/2005 | Murakami et al. ............ 315/77 |
| 2006/0170287 A1 * | 8/2006 | Ito et al. .................... 307/10.1 |
| 2007/0013321 A1 * | 1/2007 | Ito et al. ..................... 315/247 |

FOREIGN PATENT DOCUMENTS

JP    2003-187614    7/2003

* cited by examiner

*Primary Examiner*—David Hung Vu
*Assistant Examiner*—Tung X Le
(74) *Attorney, Agent, or Firm*—Dickstein Shapiro LLP

(57) ABSTRACT

A vehicular lamp lighting circuit includes a control unit configured to control an electric current that flows to a light source unit. The control unit has an electric current supply section configured to output the electric current to the light source unit, a switching controller configured to compare, with a reference voltage, and to control, by switching, the electric current that is outputted from the electric current supply section, an output current detection section configured to detect the electric current that flows into the light source unit, and a voltage transform circuit configured to transform an electric potential difference that arises from the electric current that flows into the output current detection section into a difference voltage and to output the difference voltage thus converted to the switching controller.

4 Claims, 9 Drawing Sheets

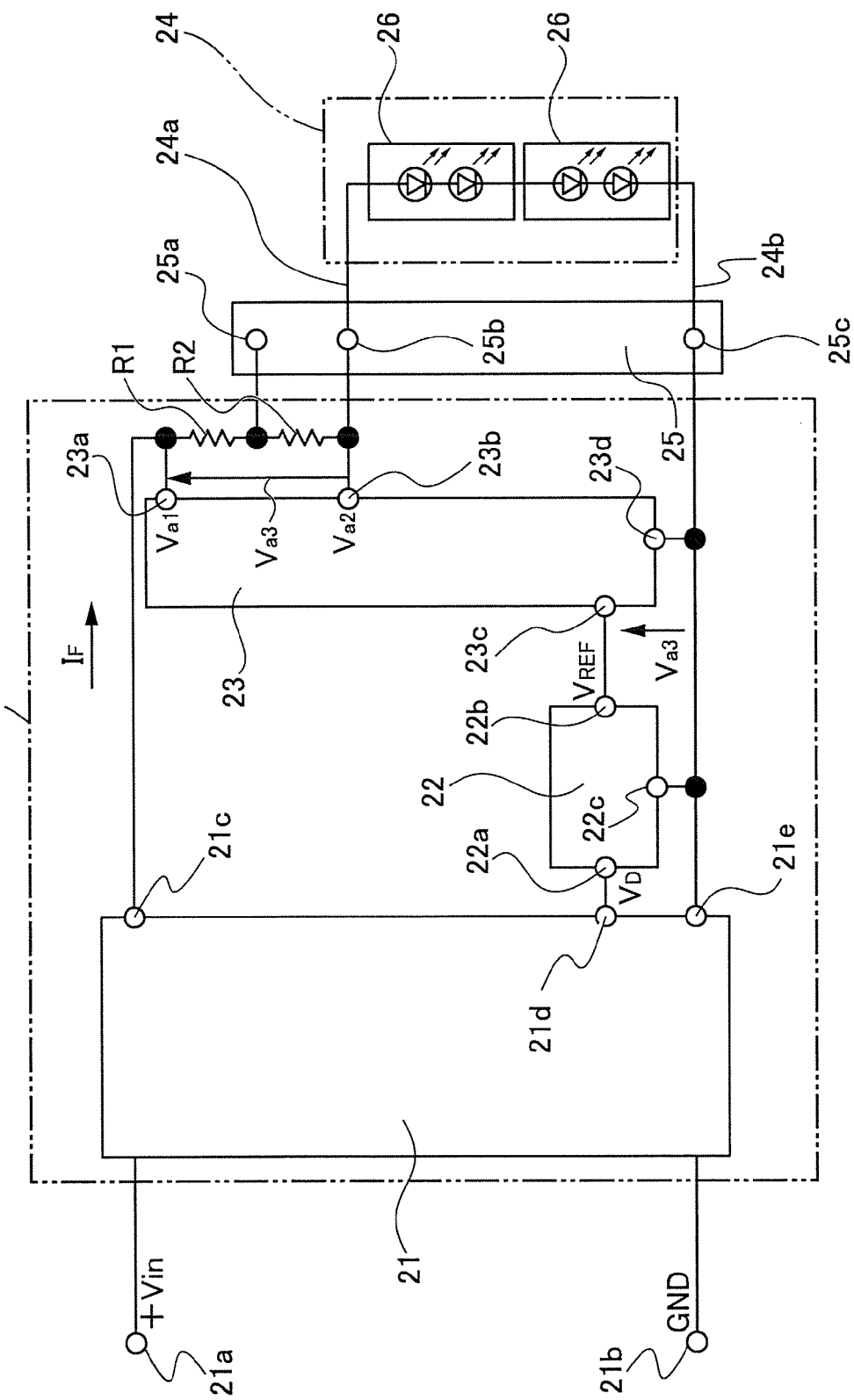

VEHICULAR LAMP LIGHTING CIRCUIT

CROSS REFERENCE TO RELATED APPLICATIONS

The present application is based on and claims priority from Japanese Application No. 2007-090528, filed Mar. 30, 2007, the disclosure of which is hereby incorporated by reference herein in its entirety.

BACKGROUND OF THE INVENTION

1. Field of the Invention

The present invention relates to an improvement to a vehicular lamp lighting circuit that is employed in a vehicular lamp, such as a headlamp, a fog lamp, or a rear combination lamp.

2. Description of the Related Art

Conventionally, a vehicular lamp lighting circuit is known with a configuration that comprises a control unit 2 and a light emitting diode (LED) unit, i.e., a light source unit, 10, such as is depicted in FIG. 1, wherein the light emitting diode (LED) unit 10 is configured from an array of a plurality of an LED 9, and the control unit 2, which is broadly configured from a voltage boosting circuit 4, a reference voltage circuit 5, an amplifier 6, a voltage detection circuit 7, and a constant current circuit 8, performs a control of a turning on of electricity to the light emitting diode (LED) unit 10; refer, for instance, to Japanese Patent Laid Open No. 2003-187614.

In such a circumstance, if a voltage V of a battery should decline, for whatever reason, an output voltage V2 declines, a current IF, which flows through the LED 9, simultaneously is reduced, and a detected voltage V1 of an output current detected resistor R1 is reduced as well. As a consequence, a control voltage V3 is reduced, a difference arises between a reference voltage of the reference voltage circuit 5 and the control voltage V3, within a voltage boosting control IC, and, in order to reduce the difference within the voltage boosting control IC, a control acts in a direction that increases a duty ratio of a transistor of the voltage boosting circuit 4, the output voltage V2 is boosted and thereby is maintained at a value prior to the reduction thereof, and the current IF is preserved at a given level.

With regard to such a conventional circuit, however, if either of a plus terminal harness 10a or a minus terminal harness 10b, which connect the array of LED 9 to the control unit 2, should be grounded (GND) for whatever reason, a fault occurs as described below:

If the minus terminal harness 10b is caught by something and shorts out in a ground (GND), then, as is depicted in FIG. 2, the current IF flows, the detected voltage V1 that arises at both ends of the output current detected resistor R1 effectively falls to zero, causing the control voltage V3 to be reduced, whereupon the difference arises between the reference voltage of the reference voltage circuit 5 and the control voltage V3, within the voltage boosting control IC, and, in order to reduce the difference within the voltage boosting control IC, the control acts in the direction that increases the duty ratio of the transistor of the voltage boosting circuit 4, and the output voltage V2 is boosted, and repeating the control thereof over a plurality of instances gradually boosts the output voltage V2, increasing the current IF, such that the current IF that flows to the LED 9 significantly exceeds the constant current, and the light emitting diode (LED) unit 10 is destroyed as a result.

If the plus terminal harness 10a is caught by something and shorts out in the ground (GND), then, as is depicted in FIG. 3, the current IF would cease to flow to the light emitting diode (LED) unit 10, and thus, as with the shorting out of the minus terminal harness 10b, the detected voltage V1 effectively falls to zero, causing the control voltage V3 to be reduced, whereupon the difference arises between the reference voltage of the reference voltage circuit 5 and the control voltage V3, within the voltage boosting control IC, and, in order to reduce the difference within the voltage boosting control IC, the control acts in the direction that increases the duty ratio of the transistor of the voltage boosting circuit 4, and the output voltage V2 is boosted, and thus, the output voltage V2 is gradually boosted, increasing the current IF, and, while almost all of the current IF is going to ground (GND), thereby avoiding the destruction of the light emitting diode (LED) unit 10, repeating the control thereof over a plurality of instances causes the control unit 2 itself to be burnt out and thereby rendered unusable instead.

SUMMARY OF THE INVENTION

The present invention was devised with the foregoing circumstance in mind, and has as an objective to provide a vehicular lamp lighting circuit that is capable of preventing the burning out of the control unit, or the destruction of the light source unit, even when the harness that is connected to the light source unit shorts out.

An aspect of the present invention relates to a vehicular lamp lighting circuit including a control unit configured to control an electric current that flows to a light source unit having an electric current supply section configured to output the electric current to the light source unit, a switching controller configured to compare, with a reference voltage, and to control, by switching, the electric current that is outputted from the electric current supply section, an output current detection section configured to detect the electric current that flows into the light source unit, and a voltage transform circuit configured to transform an electric potential difference that arises from the electric current that flows into the output current detection section into a difference voltage and to output the difference voltage thus converted to the switching controller; wherein the output current detection section is connected to a high electric potential side of the light source unit, and the switching controller compares the reference voltage with the difference voltage and controls the electric current supply section so as to reduce the difference therebetween.

Preferably, the output current detection section is a resistor for detection of an output current.

Preferably, the light source unit is formed from an array in which a plurality of light emitting diode (LED) is connected in a series, the high electric potential side of the light source unit is connected to the resistor for detection of the output current via a plus terminal harness, and a low electric potential side of the light source unit is connected to a ground via a minus terminal harness.

Preferably, a connector, comprising a plurality of connector pins, is installed between the control unit and the light source unit, the light source unit is selectively connected to one of the plurality of connector pins, and the electric current that flows to the light source unit is selectable.

BRIEF DESCRIPTION OF THE DRAWINGS

These and other features, aspects, and advantages of the present invention will become better understood with regard to the following description, appended claims, and accompanying drawings.

FIG. 8B is a circuit diagram that describes a conceptual configuration of a vehicular lamp lighting circuit according to a second embodiment of the present invention, depicting a state that treats an upper level terminal that is depicted in FIG. 8A as being in an open state, and a lower level terminal that is depicted in FIG. 8A as being in a connected state.

DETAILED DESCRIPTION OF THE PREFERRED EMBODIMENTS

Following is a detailed description of preferred embodiments of a vehicular lamp lighting circuit according to the present invention.

First Embodiment

Figure 1:
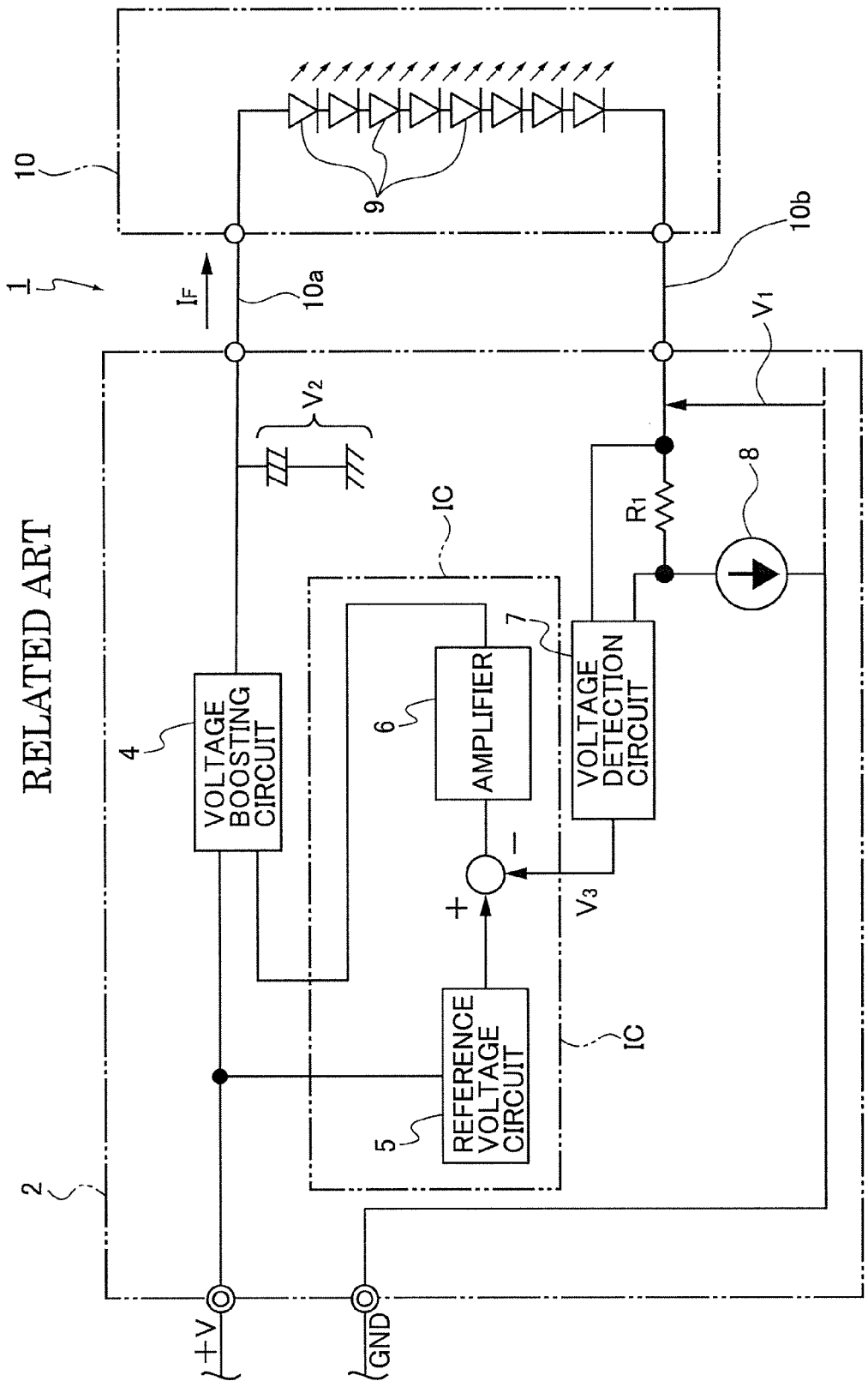
FIG. 1 is a circuit diagram that describes a conceptual configuration of a conventional vehicular lamp lighting circuit.
Figure 2:
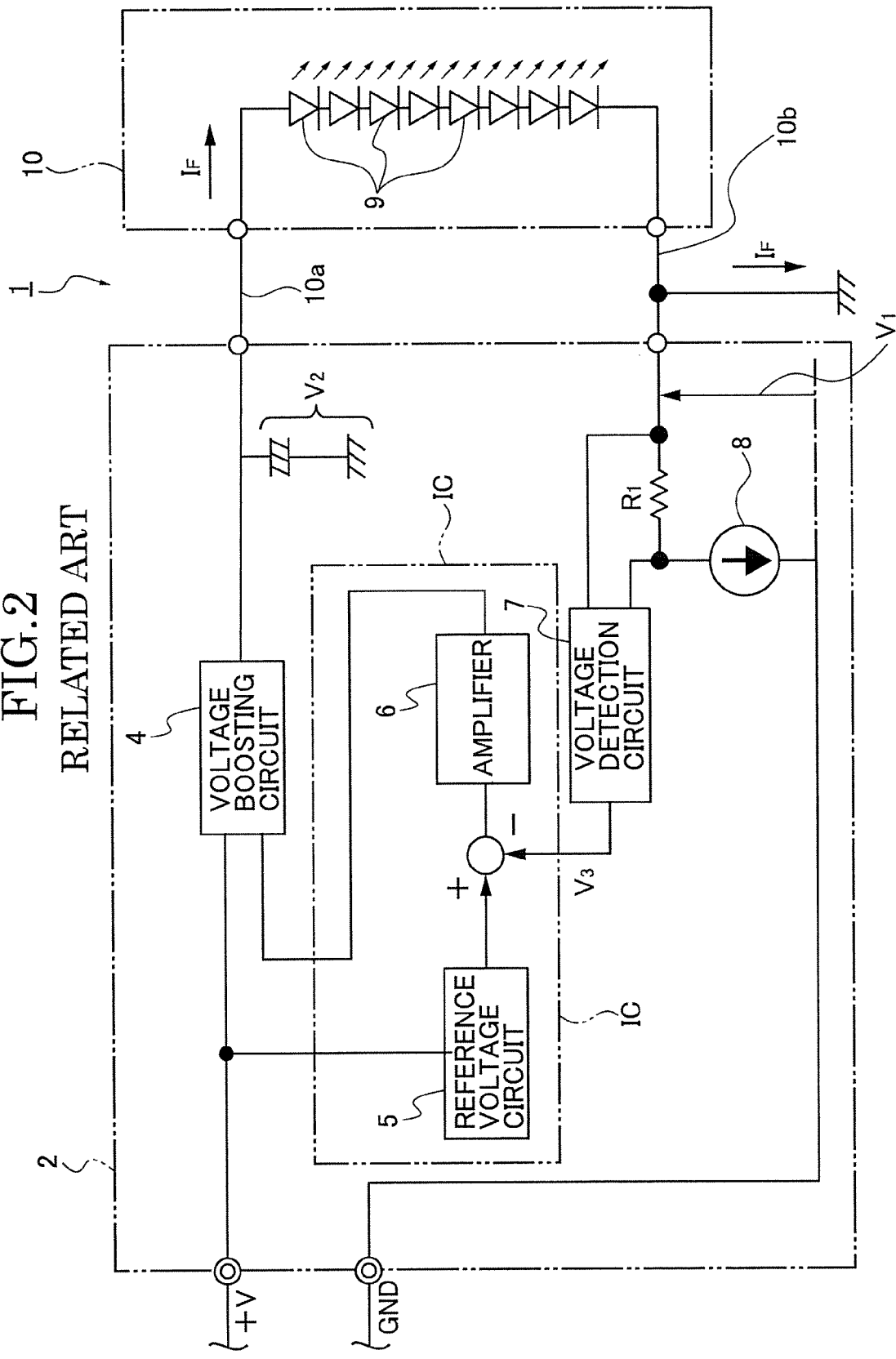
FIG. 2 is a circuit diagram that describes a circumstance wherein a minus terminal of the conventional vehicular lamp lighting circuit has shorted out.
Figure 3:
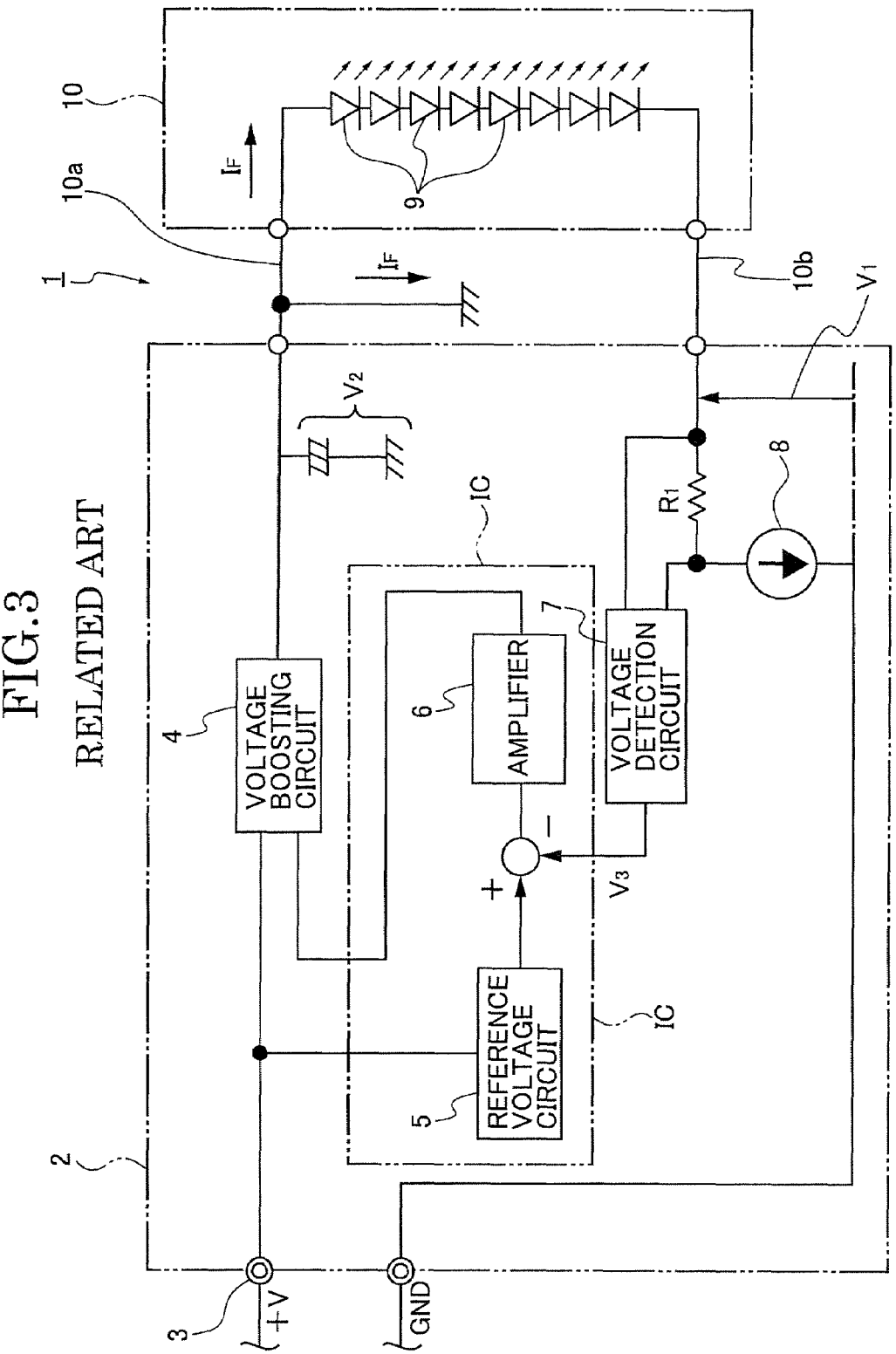
FIG. 3 is a circuit diagram that describes a circumstance wherein a plus terminal of the conventional vehicular lamp lighting circuit has shorted out.
Figure 4:
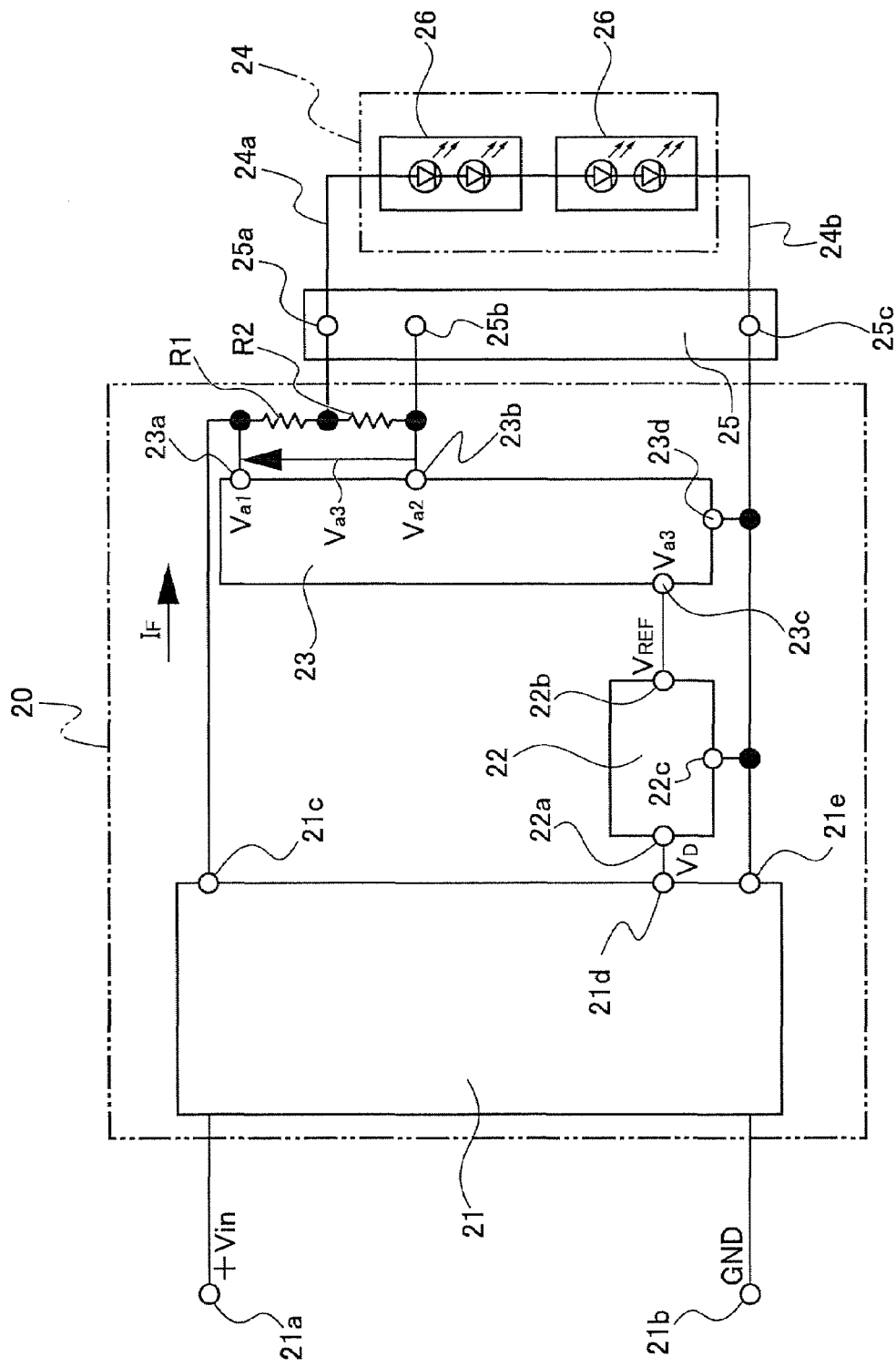
FIG. 4 is a circuit diagram that describes a conceptual configuration of a vehicular lamp lighting circuit according to a first embodiment of the present invention.

FIG. 4 describes a first embodiment of a vehicular lamp lighting circuit according to the present invention, and reference numeral 20 in FIG. 4 is a control unit. The control unit 20 comprises a switching regulator 21 as a current supply section, a switching controller 22, and a voltage transform circuit 23.

The switching regulator 21 includes a power supply terminal 21a and a ground (GND) terminal 21b on a power supply side thereof, and an output terminal 21c, a control terminal 21d, and a ground (GND) terminal 21e on an output side thereof.

A power supply voltage Vin is applied to the power supply terminal 21a from a battery (not shown), for instance, and the ground (GND) terminal 21b is grounded. The output terminal 21c is connected to one terminal of a resistor for detection of an output current as an output current detection unit R1, and to an input terminal 23a of the voltage transform circuit 23.

Figure 5:
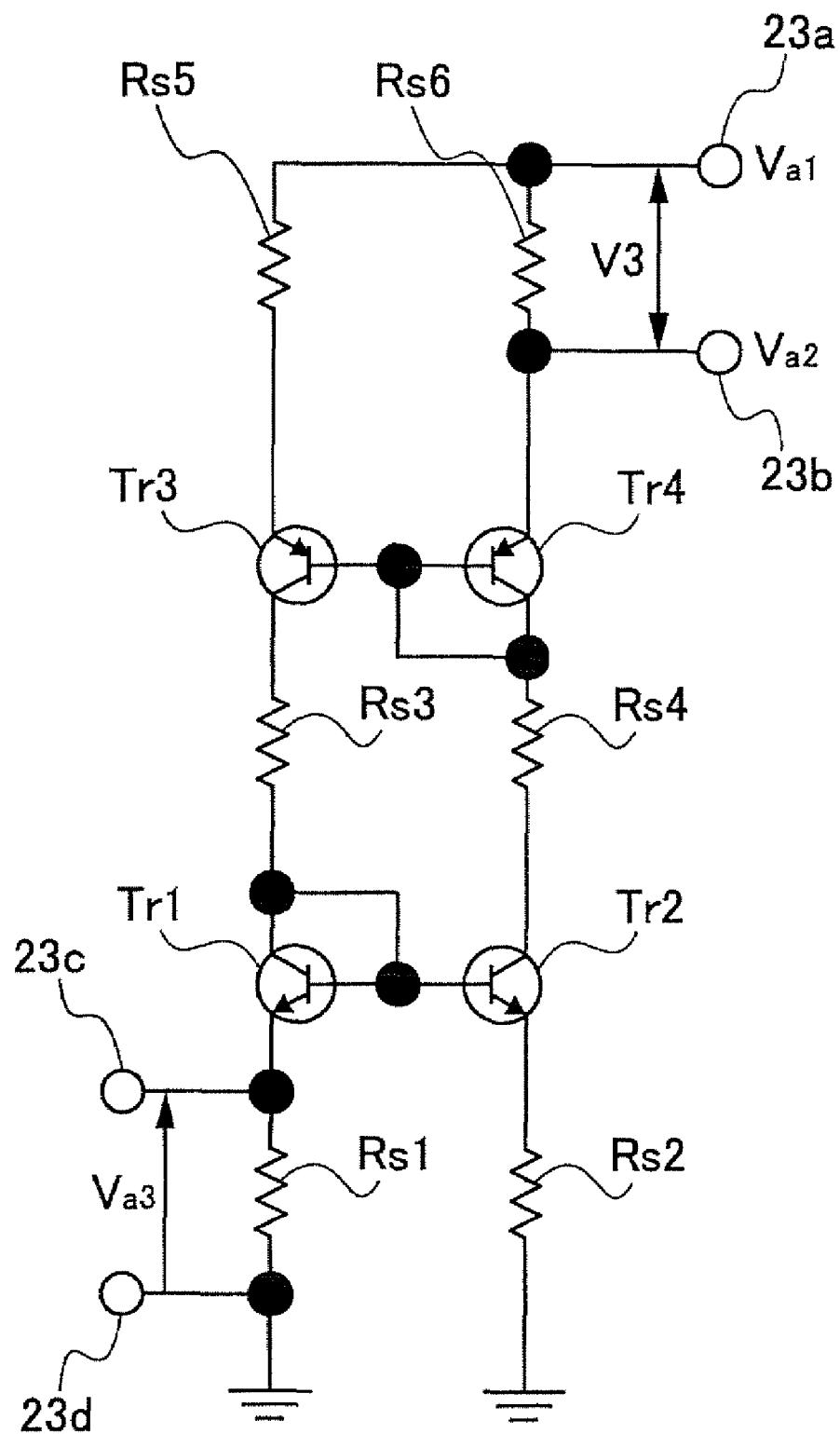
FIG. 5 is a circuit diagram that depicts an example of a voltage transform circuit that is depicted in FIG. 4.

The voltage transform circuit 23 is configured from transistors Tr1 to Tr4, and resistors Rs1 to Rs6, such as is depicted in FIG. 5, for instance. The voltage transform circuit 23 further includes an input terminal 23b and a control terminal 23c.

The control terminal 21d of the switching regulator 21 is connected to an output terminal 22a of the switching controller 22. A difference voltage V3 is inputted from the control terminal 23c of the voltage transform circuit 23 into an input terminal 22b of the switching controller 22. The switching controller 22 compares the difference voltage V3 with a reference voltage VREF, and outputs a voltage VD, which corresponds to a difference therebetween to the control terminal 21d, whereupon the switching regulator 21 outputs a current IF such that the difference therebetween goes to zero.

The other terminal of the resistor for detection of the output current R1 is connected via a plus terminal harness 24a to a high electric potential side of a light emitting diode (LED) unit 24 via a connection terminal, i.e., a connecting pin, 25a of a connector 25, and is also connected to one terminal of an unused resistor for detection of an output current R2. The other terminal of the unused resistor for detection of the output current R2 is connected to the input terminal 23b of the voltage transform circuit 23, and is also connected to a connection terminal, i.e., a connecting pin, 25b of the connector 25. In the present circumstance, the connection terminal, i.e., the connecting pin, 25b is open.

The light emitting diode (LED) unit 24 is formed from an array of an LED element 26, and a low electric potential terminal of the light emitting diode (LED) unit 24 is connected to a ground (GND) terminal, i.e., a ground (GND) connecting pin, 25c of the connector 25, via a minus side harness 24b. The ground (GND) terminal 25c is connected to a ground (GND) terminal 23d of the voltage transform circuit 23, a ground (GND) terminal 22c of the switching controller 22, and the ground (GND) terminal 21e of the switching regulator 21.

The voltage transform circuit 23 treats an electric potential of the input terminal 23a as Va1, treats an electric potential of the input terminal 23b as Va2, and outputs a voltage Va3, which is equivalent to a difference of Va1−Va2, from the control terminal 23c to the input terminal 22b.

If it is presumed that the voltage transform circuit 23 is not generally provided, the switching regulator 21 controls the light emitting diode (LED) unit 24 such that a voltage that flows through both terminals thereof is the reference voltage VREF, by the current IF flowing into the resistor for detection of the output current R1. Put another way, the current that flows to the light emitting diode (LED) unit 24 is controlled by the resistor for detection of the output current R1.

According to the first embodiment, the voltage transform circuit 23 is included, and thus, the current IF is as follows:

Current $IF=(Va1-Va2)$/Resistance Value of the Resistor for Detection of the Output Current $R1$ Given that (Va1−Va2) is equivalent to Va3, then either Current $IF=Va3$/Resistance Value of the Resistor for Detection of the Output Current $R1$ or Current $IF=VREF$/Resistance Value of the Resistor for Detection of the Output Current $R1$ Put another way, the switching regulator 21 is controlled by the switching controller 22 and the current IF flows to the light emitting diode (LED) unit 24, such that the difference voltage (Va1−Va2) is equivalent to the reference voltage VREF.

Figure 6:
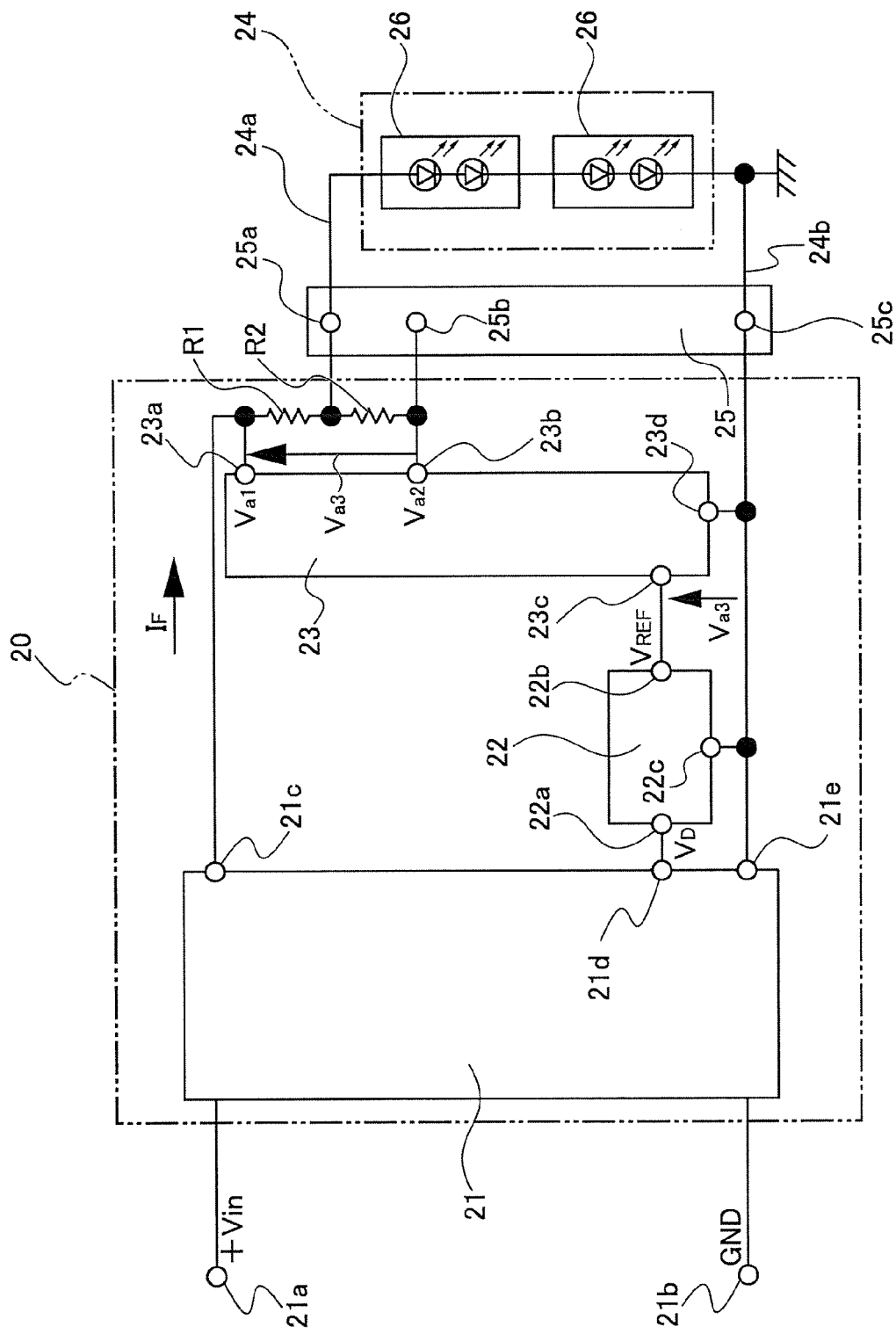
FIG. 6 is a circuit diagram that describes a flow of a current in a circumstance wherein a minus terminal of the vehicular lamp lighting circuit that is depicted in FIG. 4 has shorted out.

Given the present circuit configuration, even if the minus side harness 24b shorts out into the ground (GND) for some reason or other, such as is depicted in FIG. 6, the current IF that flows into the resistor for detection of the output current R1 is the same as before the minus terminal harness 24b shorts out, and thus, the control is performed as per normal.

Figure 7:
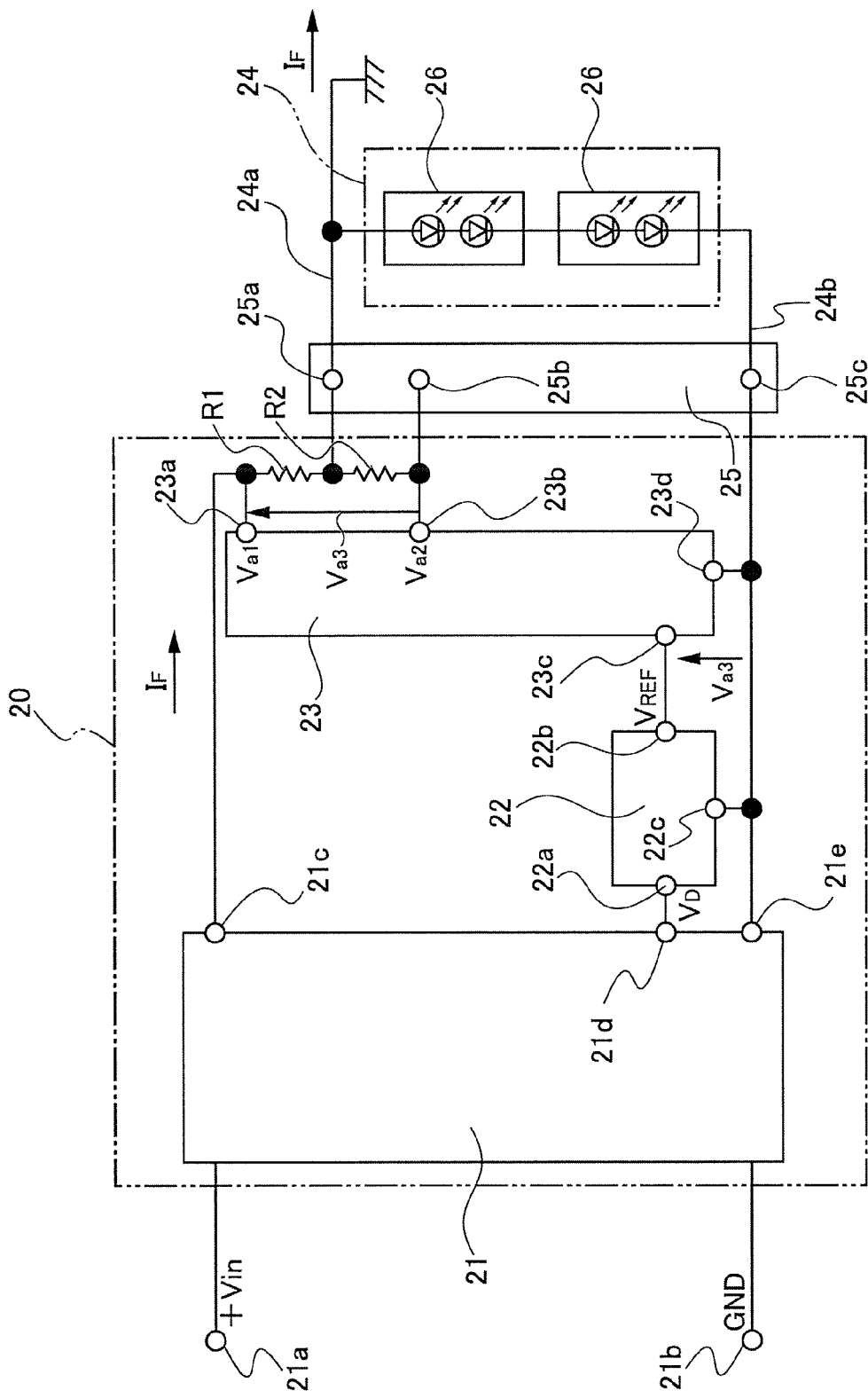
FIG. 7 is a circuit diagram that describes a flow of a current in a circumstance wherein a plus terminal of the vehicular lamp lighting circuit that is depicted in FIG. 4 has shorted out.

If, on the other hand, the plus terminal harness 24a shorts out into the ground (GND) for some reason or other, such as is depicted in FIG. 7, the electric potential of the plus terminal harness 24a goes to zero volts. Accordingly, the electric potential Va3 of the input terminal 23b goes to zero volts. The current IF, however, continues to flow through the resistor for detection of the output current R1, and thus, the electric potential Va1 that is inputted into the input terminal 23b is greater than zero volts.

Accordingly, the difference voltage Va3 is also greater than zero volts. The difference voltage Va3 is equivalent to an electric potential difference (Va1−Va2) that arises as a result of a current flowing that possesses a current value different from a current value of the current IF.

Whereas the switching regulator 21 continues supplying the current IF to the light emitting diode (LED) unit 24 and the ground (GND) in the state wherein the plus terminal harness 24a shorts out into the ground (GND), the increase of the current IF is interrupted at a point in time when the difference voltage Va3 becomes equivalent to the reference voltage VREF, such that, accordingly, a circuit operation of the switching regulator 21 is stable, and a burnout or a destruction of the switching regulator 21 is prevented thereby.

Second Embodiment

Figure 8A:
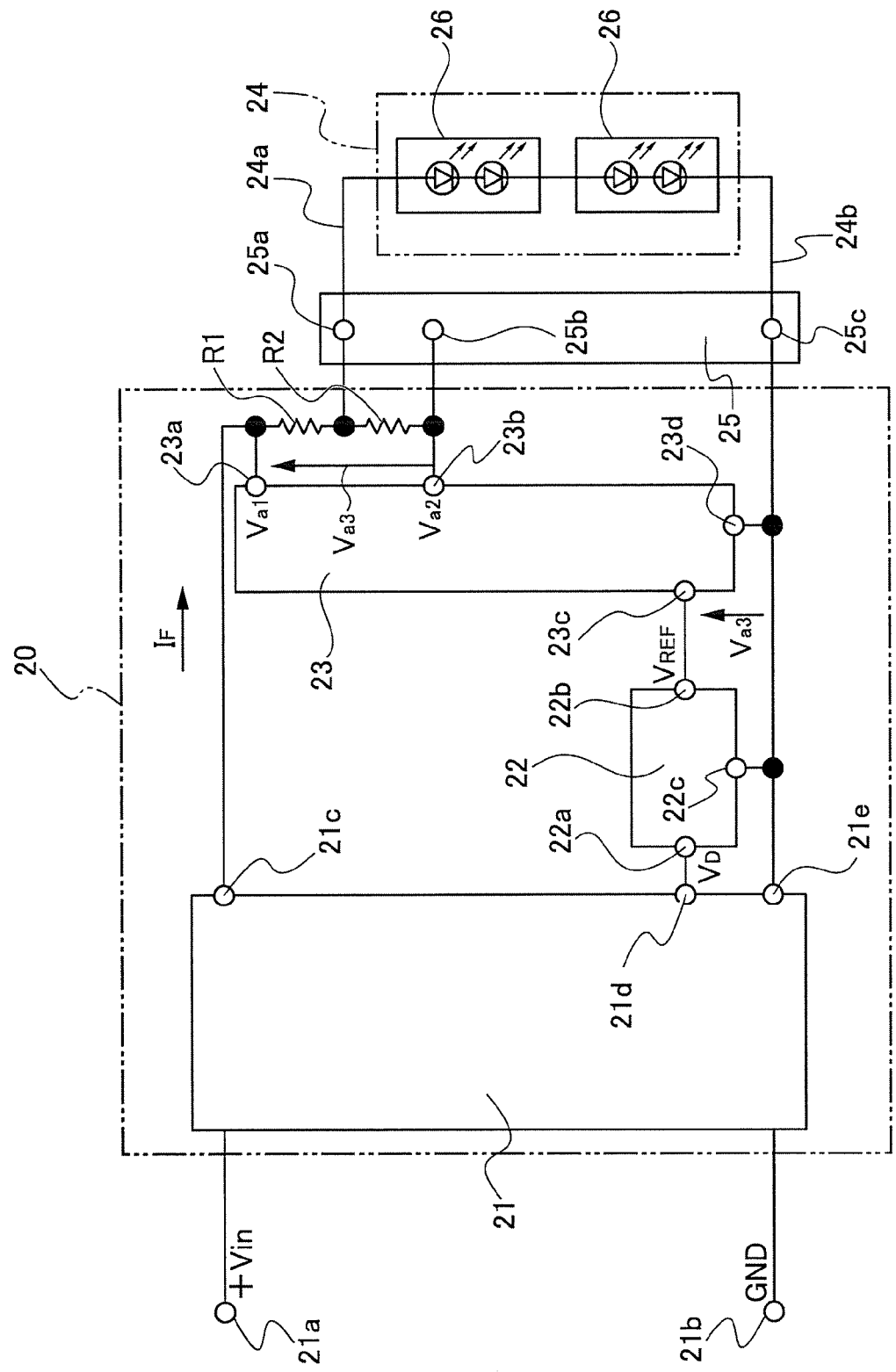
FIG. 8A is a circuit diagram that describes a conceptual configuration of a vehicular lamp lighting circuit according to a second embodiment of the present invention, which depicts a construction that is identical to the vehicular lamp lighting circuit that is depicted in FIG. 4.

According to a second embodiment, a configuration is presumed wherein the plus terminal harness 24a, such as is depicted in FIG. 8B is connected to the connection terminal 25b is in the open state, such as is depicted in FIG. 8A.

Given such a configuration, the current IF is determined by the resistance value of the resistor for detection of the output current R1 and the resistance value of the resistor for detection of the output current R2.

If the resistors for detection of the output current R1 and R2 are treated as 1.0Ω (ohm), and the reference voltage VREF is treated as 1.0 volts, for instance, the switching controller 22 adjusts the current IF of the switching regulator 21 such that the voltage of the reference voltage VREF is 1.0 volts. Put another way, the current IF is adjusted such that the voltage V3 is the reference voltage VREF, i.e., 1.0 volts.

When the plus terminal harness 24a is connected to the connection terminal 25a, such as is depicted in FIG. 8A, an inputted impedance that is inputted into the input terminal 23b of the voltage transform circuit 23, the inputted impedance that is inputted into the input terminal 23b of the voltage transform circuit 23 is sufficiently large as compared with the resistor for detection of the output current R1, and thus, the current IF flows only through the resistor for detection of the output current R1 to the light emitting diode (LED) unit 24, and the current IF is V3/R1, i.e., 1.0 volt/1.0 ohm, =1.0 amp.

Conversely, when the plus terminal harness 24a is connected to the connection terminal 25b, such as is depicted in FIG. 8B, the current IF flows through the resistors for detection of the output current R1 and R2 to the light emitting diode (LED) unit 24, and the current IF is V3/(R1+R2), i.e., 1.0 volt/2.0 ohm, =0.5 amp.

Put another way, it is possible to select the current that flows to the light emitting diode (LED) unit 24, depending on whether the plus terminal harness 24a is connected to the connection terminal 25a or 25b.

According to the second embodiment, the control is executed in a manner similar to the control that is executed according to the first embodiment when the plus terminal harness 24a shorts out into the ground (GND) for some reason or other, even when the plus terminal harness 24a is connected to the connection terminal 25b. Therefore, the burning out and the destruction of the circuit of the switching regulator 21 are prevented.

According to the present invention, an effect is demonstrated of being capable of preventing the burning out of the control circuit, or the destruction of the light source unit, even when the harness that is connected to the light source unit shorts out.

In particular, according to one embodiment of the present invention, an effect is demonstrated of being capable of selecting the current that flows into the light source unit.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A vehicular lamp lighting circuit, comprising:
   a control unit configured to control an electric current that flows to a light source unit, and wherein the control unit includes:
   an electric current supply section configured to output the electric current to the light source unit;
   a switching controller;
   an output current detection section configured to detect the electric current that flows into the light source unit; and
   a voltage transform circuit configured to transform an electric potential difference that arises from an electric current that flows into the output current detection section into a difference voltage and to output the difference voltage thus converted to the switching controller;
   wherein the output current detection section is connected to a high electric potential side of the light source unit; and
   wherein the switching controller compares the reference voltage with the difference voltage, and wherein the switching controller controls, by switching, the electric current that is outputted from the electric current supply section so as to reduce the difference between the reference voltage and the difference voltage.

2. The vehicular lamp lighting circuit according to claim 1, wherein:
   the electric current supply section is a switching regulator; and
   the output current detection section is a resistor for detection of an output current.

3. The vehicular lamp lighting circuit according to claim 2, wherein:
   the light source unit is formed from an array in which a plurality of light emitting diode (LED) is connected in a series;
   the high electric potential side of the light source unit is connected to the resistor for detection of the output current via a plus terminal harness; and
   a low electric potential side of the light source unit is connected to a ground via a minus terminal harness.

4. The vehicular lamp lighting circuit according to claim 3, wherein:
   a connector, comprising a plurality of connector pins, is installed between the control unit and the light source unit;
   the light source unit is selectively connected to one of the plurality of connector pins; and
   the electric current that flows to the light source unit is selectable.

* * * * *